(12) United States Patent
Chen et al.

(10) Patent No.: US 11,460,160 B2
(45) Date of Patent: Oct. 4, 2022

(54) LAMP HOLDER, BATTERY ASSEMBLY AND SUPPLEMENTARY LIGHTING LAMP

(71) Applicant: SHENZHEN SOONWELL TECHNOLOGY CO., LTD., Shenzhen (CN)

(72) Inventors: Kai Chen, Shenzhen (CN); Zhangming Tan, Shenzhen (CN)

(73) Assignee: SHENZHEN SOONWELL TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 17/224,156

(22) Filed: Apr. 7, 2021

(65) Prior Publication Data
US 2022/0205602 A1    Jun. 30, 2022

(30) Foreign Application Priority Data

| Dec. 31, 2020 | (CN) | ......................... 202023317226.4 |
| Jan. 9, 2021 | (CN) | ......................... 202120049164.9 |
| Jan. 9, 2021 | (CN) | ......................... 202120049285.3 |

(51) Int. Cl.
| *F21S 9/02* | (2006.01) |
| *F21V 17/10* | (2006.01) |
| *F21V 23/02* | (2006.01) |
| *F21V 17/16* | (2006.01) |
| *F21S 4/28* | (2016.01) |
| *H02J 7/00* | (2006.01) |
| *H02J 7/02* | (2016.01) |
| *H05B 45/3725* | (2020.01) |
| *F21Y 115/10* | (2016.01) |
| *F21Y 103/10* | (2016.01) |

(52) U.S. Cl.
CPC .... *F21S 9/02* (2013.01); *F21S 4/28* (2016.01); *F21V 17/101* (2013.01); *F21V 17/162* (2013.01); *F21V 23/02* (2013.01); *H02J 7/00302* (2020.01); *H02J 7/00306* (2020.01); *H02J 7/02* (2013.01); *H05B 45/3725* (2020.01); *F21Y 2103/10* (2016.08); *F21Y 2115/10* (2016.08); *H02J 2207/20* (2020.01)

(58) Field of Classification Search
None
See application file for complete search history.

(56) References Cited

U.S. PATENT DOCUMENTS

| 10,197,224 B1* | 2/2019 | Macias | ................. H05B 45/20 |
| 2012/0293996 A1* | 11/2012 | Thomas | .................... F21K 9/27 |
| | | | 362/249.02 |
| 2016/0290606 A1* | 10/2016 | Honold | .............. H01R 33/0836 |

* cited by examiner

*Primary Examiner* — Elmito Breval

(57) ABSTRACT

The present disclosure discloses a lamp holder, a battery assembly and a supplementary lighting lamp. The lamp holder includes a housing and a rotation assembly rotating relative to the housing, wherein the rotation assembly includes a cover body, a resisting member and an adjusting member moving relative to the cover body, and the housing includes a fastener formed on a first end thereof. The adjusting member moves on the cover body so that the resisting member is resisted against the fastener, thus the rotation assembly is clamped with the housing or separated from the housing. The present disclosure has the advantages of convenient disassembly and good waterproof performance.

9 Claims, 20 Drawing Sheets

LAMP HOLDER, BATTERY ASSEMBLY AND SUPPLEMENTARY LIGHTING LAMP

BACKGROUND

1. Technical Field

The present disclosure generally relates to illumination technology fields, and more particularly to a lamp holder, a battery assembly and a supplementary lighting lamp.

2. Description of Related Art

As a kind of lighting equipment, a light source lamp is widely used for supplementing light, city lighting constructions and advertises. At present, a conventional disassembly structure with a built-in battery box on the market can open a battery of the built-in battery box by rotating a cover included in the disassembly structure, such kind of disassembly structure is easy to result the cover to be lost. In addition, a fixed structure between the cover and the built-in battery box is unstable, so that it is necessary to provide a new light source lamp that can be firmly locked and conveniently disassembled.

At present, there are many kinds of batteries on the market. A lithium battery is stood out from a plurality of batteries with its advantages of light weight, large capacity and high energy density, and has become a mainstream battery storage product. If a conventional battery assembly is designed as a single too long length, uneven forces can be easy to occur at the middle of the battery assembly, resulting in damaging or fracturing the battery assembly during using the battery assembly. Therefore, a new battery assembly that a plurality of cells can be connected in series to vary the lengths of the cells is needed to join a plurality of battery assemblies together.

SUMMARY

In view of the shortcomings of the related art, the present disclosure provides a lamp holder, a battery assembly and a supplementary lighting lamp which can solve the above mentioned problems.

A lamp holder according to an embodiment of the present disclosure includes: a housing connected to a lampshade, and a rotation assembly rotating relative to the housing. The rotation assembly includes a cover body, a resisting member and an adjusting member moving relative to the cover body, and the housing includes a fastener formed on a first end thereof. The adjusting member moves on the cover body so that the resisting member is resisted against the fastener, thus the rotation assembly is clamped with the housing or separated from the housing.

Preferably, the resisting member includes a sliding block connected to the adjusting member, a pair of clamping blocks arranged on the sliding block and connected to or separated from the fasteners, and two opposite guiding rails respectively arranged on the pair of clamping blocks.

Preferably, the cover body includes a pair of guiding recesses for respectively receiving the two opposite guiding rails therein so that the two opposite guiding rails move in the pair of guiding recesses, respectively. The cover body further includes a limiting block arranged between the two opposite guiding rails, when the resisting member is clamped with the fastener, the sliding block is resisted against the limiting block.

Preferably, the adjusting member includes a rotating portion, and a rotating shaft arranged on the rotating portion and rotatably connected to the cover body. The rotating shaft includes a first gear and the sliding block includes a second gear meshed with the first gear. A pressing portion is protruded upwardly from the rotating portion and toggled by a user to rotate the rotating portion. The cover body includes a holding block arranged on a first side thereof towards the rotating portion, and when the rotating portion is received in the cover body, the rotating portion is placed on the holding block.

Preferably, a battery chamber is arranged on a first end of the housing towards the rotation assembly and close to the cover body rotating with the housing, for receiving a plurality of mutually spliced battery assemblies therein.

Preferably, the lampshade is arranged on the housing and includes a waterproof plate made of aluminum alloy, and the waterproof plate includes a first potting glue groove formed on a first portion thereof towards the lampshade, and a first bulge formed on the lampshade towards the waterproof plate and corresponding to the first potting glue groove, so that the first bugle is fixed on the waterproof plate by injecting glue into the first potting glue groove.

Preferably, the waterproof plate further includes a waterproof member arranged on a second portion thereof away from the lampshade. The waterproof member includes a first waterproof cover and a second waterproof cover connected with each other by a dispensing glue way, and a PCB structure is received between the first waterproof cover and the second waterproof cover.

Preferably, the first waterproof cover includes a second potting glue groove arranged on an end thereof towards the second waterproof cover, wherein the second waterproof cover includes a second bulge arranged towards the first waterproof cover and corresponding to the second potting glue groove, and the first waterproof cover is fixed on the second waterproof cover by injecting glue into the second potting glue groove.

Preferably, the lamp holder further includes:
- an alternating current (AC) input configured to be connected with an alternating current mains supply;
- an AC-DC conversion circuit: electrically connected to AC input;
- a battery DC input electrically connected to a lithium battery received in the lamp holder;
- a lithium battery protection circuit electrically connected to the battery DC input;
- a DC-DC conversion circuit connected to both the AC-DC conversion circuit and the lithium battery protection circuit, when the AC input and the battery DC input are input at the same time, the AC input is preferred to be selected;
- an LED control circuit electrically connected to the DC-DC conversion circuit; and
- an LED lamp panel electrically connected to the LED control circuit.

Preferably, the lithium battery protection circuit includes a lithium battery balanced protection circuit and a lithium battery over-charge and over-discharge protection circuit connected to each other. The lithium battery balanced protection circuit is electrically connected to the battery DC input, and the lithium battery over-charge and over-discharge protection circuit is electrically connected to the DC-DC conversion circuit.

Preferably, the lamp holder further includes a plurality of spliced battery assemblies and an AC charging module electrically connected to the plurality of spliced battery assemblies, both the plurality of spliced battery assemblies and the AC charging module are received in the housing. The housing includes an AC input interface and an AC output interface respectively arranged close to the AC charging module, the AC input interface is connected with the AC input, and the A.C. output interface is connected in series with an AC input interface of another lamp holder.

Preferably, the AC charging module includes a battery box connected between the battery assembly and the housing, and a PCB received in the battery box at a side close to the AC input interface, the PCB includes a display screen and a plurality of buttons respectively exposed out of the battery box.

Preferably, the PCB includes an AC PCB and a connecting member clamped with both the PCB and the AC PCB, the battery box includes a receiving recess corresponding to the AC PCB, and the AC PCB is clamped on the receiving recess.

In order to solve the above technical problems, a battery assembly, installed in a battery chamber of a lamp holder, according to an embodiment of the present: disclosure includes: the battery assembly including at least one battery, a battery box for receiving the at least one battery therein, and a first cover and a second cover respectively arranged on two sides of the battery box. The first cover includes a first buckle and a first contacting point, the second cover includes a second buckle and a second contacting point respectively corresponding to the first buckle and the first contacting point, when the battery assembly is connected with an adjacent battery assembly, the first buckle of the battery assembly is clamped with the second buckle of the adjacent battery assembly, and the first contacting point of the battery assembly is electrically in contact with the second contacting point of the adjacent battery assembly so as to completely splice the two battery boxes.

Preferably, the number of the at least one battery is two, and the at least one battery is a lithium battery and electrically connected to both the first and second contacting points. The first buckle includes a fastening portion and a connecting portion connected with each other, the connecting portion is fixedly connected with the first cover and having a curved configuration so that the fastening portion is connected with a curved end of the connecting portion. The second cover includes a groove with a shape corresponding to the first buckle, the second buckle is received in the groove and protruding towards away from the at least one battery.

Preferably, the battery assembly includes a circuit board received in the battery box, one end of the circuit board is electrically connected to the at least one battery, the second contacting point is arranged on the circuit board and electrically connected to the circuit board, and the second cover includes a DC charging interface electrically connected to the circuit board.

Preferably, the battery box includes a receiving hole for receiving the at least one battery therein, and the receiving hole is a through-hole and an inner wall of the receiving hole is concave with a receiving recess so that the circuit board is placed on the receiving recess. The first cover and the second cover are respectively include a first sealing block and a second sealing block respectively corresponding to the receiving hole; when both the first and second covers are connected with the battery box, the first and second sealing blocks and the receiving hole are tightly sealed.

Preferably, a power light is arranged on the circuit board and electrically connected to the circuit board, the second cover includes a lamp hole corresponding to the power light.

In order to solve the above technical problems, a supplementary lighting lamp according to an embodiment of the present disclosure includes a lamp holder and a battery assembly received in the lamp holder; wherein a lamp holder includes a housing connected to a lampshade, and a rotation assembly rotating relative to the housing; the rotation assembly includes a cover body moving relative to the housing, a resisting member and an adjusting member rotating on the cover body and resisted against the resisting member; the housing includes a fastener formed on a first end thereof and connected to the resisting member. The adjusting member is rotated to drive the resisting member following to move so that the resisting member is clamped with the fastener or separated from the fastener.

The battery assembly includes at least one battery, a battery box for receiving the at least one battery therein, and a first cover and a second cover respectively arranged on two sides of the battery box. The first cover includes a first buckle and a first contacting point, the second cover includes a second buckle and a second contacting point respectively corresponding to the first buckle and the first contacting point. When the battery assembly is connected with an adjacent battery assembly, the first buckle of the battery assembly is clamped with the second buckle of the adjacent battery assembly, and the first contacting point of the battery assembly is electrically in contact with the second contacting point of the adjacent battery assembly so as to completely splice two battery boxes.

The housing includes a light source arranged far away from the lampshade.

Preferably, a battery chamber is arranged on a first end of the housing towards the rotation assembly and close to the cover body rotating with the housing, for receiving a plurality of mutually spliced battery assemblies therein.

Comparing with the related art, the present disclosure has the advantages as described below:

First, the lamp holder includes the housing and the rotation assembly rotating relative to the housing, wherein the rotation assembly includes a cover body rotating relative to the housing, a resisting member and an adjusting member rotating on the cover body and resisted against the resisting member. The housing includes a fastener formed on a first end thereof and passing through the cover body and then connected to the resisting member. The adjusting member is rotated to drive the resisting member following to move so that the resisting member is clamped with or separated from the fastener, thereby the rotation assembly can be conveniently detached from the housing. With such design, the battery assembly can be easily disassembled from the housing through a matching relationship between the resisting member and the fastener.

Second, the resisting member includes a sliding block connected to the adjusting member, and a pair of clamping blocks arranged on the sliding block and connected to or separated from the fastener. A locking or disassembly between the housing and the rotation assembly is realized by adopting a position matching relationship between the pair of clamping blocks and the fastener.

Third, the resisting member includes two opposite guiding rails respectively arranged on the pair of clamping blocks; the cover body includes a pair of guiding recesses for respectively receiving the two opposite guiding rails therein, so that the two opposite guiding rails can move in the pair of guiding recesses. By slidable engagement between the guiding rails and the guiding recesses, the resisting member can move along a fixed direction to avoid the resisting member from offsetting from the cover body.

Fourth, a limiting block is arranged between the two opposite guiding rails, when the resisting member is clamped with the fastener, the sliding block is resisted against the limiting block, and the limiting block is provided for further limiting movement of the resisting member.

Fifth, by meshing the first gear with the second gear, the adjusting member is rotated to directly drive the resisting member to move through the ingenious design. A pressing portion is protruded upwardly from the rotating portion and toggled by a user to rotate the rotating portion, so that the user can directly toggle the pressing portion, so as to control the rotation of the rotation portion.

Sixth, the lamp holder includes an exposed lampshade with a curved configuration, wherein the lampshade includes a waterproof plate made of aluminum alloy and including a first potting glue groove formed on a first portion thereof towards the lampshade, and a first bulge formed on the lampshade towards the waterproof plate and corresponding to the first potting glue groove, so that the first bugle is fixed on the waterproof plate by injecting glue into the first potting glue groove. The waterproof plate made of aluminum alloy can facilitate auxiliary heat dissipation of the lampshade to enhance heat dissipation effects, and good waterproof effect can be obtained by fixing the first bulge and the first potting glue groove by glue.

Seventh, a battery chamber is arranged on a first end of the housing towards the rotation assembly and close to the cover body rotating with the housing, for receiving a plurality of mutually spliced batters-assemblies therein. With such design, when the cover body is unrolled from the housing, the battery chamber is arranged close to the cover body rotated with the housing, so that the battery assembly is difficult to slip out of the battery chamber.

Eighth, by the DC-DC conversion circuit, the AC input and the battery DC input are configured to separately supply power for the LED lamp panel. When the AC input and the battery DC input are input at the same time, the AC input is preferred to be selected. When the battery DC input is out of power, the AC input can supply power to the LED lamp panel, while, when the AC input is out of power, the battery DC input can supply power to the LED lamp panel, such dual power supply mode can use an AC power supply or a separate battery to power the LED lamp panel. When using the lamp holder, the user can directly connect to the AC input to supply power for the lamp holder; when the AC input environment is not available, the battery can be directly used to supply power for the lamp holder. When the AC input and the battery DC input are used to supply power at the same time, the AC input power supply mode is preferred to be selected so that the lamp holder can be charged via various ways.

Ninth, the first buckle is correspondingly connected to the second buckle, and the first contacting point is correspondingly connected to the second contacting point, so any two battery assemblies are easy to realize mechanical splicing and electrical connection therebetween, and electrical transmission between a plurality of spliced battery assemblies can be facilitated. The plurality of sliced battery assemblies is to avoid an uneven force from occurring at a middle end of a single long battery assembly, which is conducive to protect the battery assembly. The number of the battery assemblies can also be selected according to requirements, which is convenient and practical. The DC charging interface is designed to conveniently charge the battery assembly, and the lamp hole is corresponding to the power light, which conveniently and intuitively displays a battery power of the battery. The guiding rails and the guiding recess are provided to play as a guiding role for conveniently receiving the battery assembly into the battery chamber.

BRIEF DESCRIPTION OF THE DRAWINGS

In order to more clearly understand the technical solution hereinafter embodiments of the present disclosure, a brief description to the drawings used in detailed description of embodiments hereinafter is provided thereof. Obviously, the drawings described below are some embodiments of the present disclosure, for one of ordinary skill in the art, other drawings can be obtained according to the drawings below on the premise of no creative work.

Figure 1:
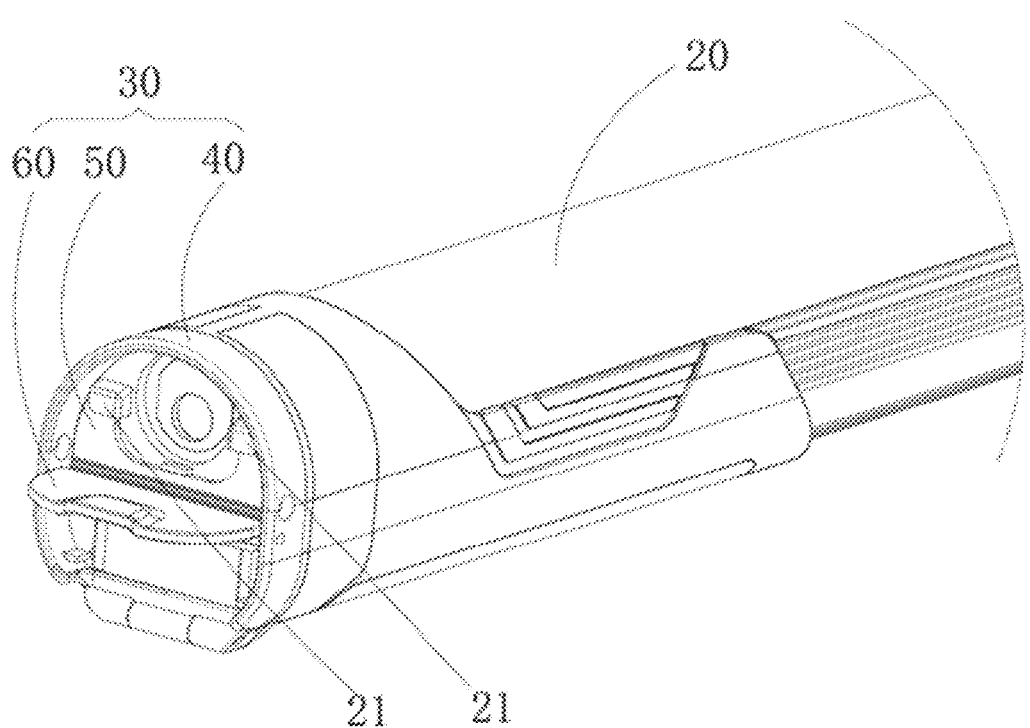
FIG. 1 is a schematic view of a lamp holder in accordance with are embodiment of the present disclosure.

The element labels according to the exemplary embodiments of the present disclosure are shown as below:

lamp holder 10, housing 20, first end 20*a*, inner wall 20*b*, fastener 21, waterproof hole 22, battery chamber 23, rotation assembly 30, cover body 40, first side 40a, second side 40b, guiding recess 41, limiting block 42, holding block 43, waterproof ring 44, through-hole 45, casing 46, rotating hole 47, resisting member 50, sliding block 51, clamping block 52, guiding rail 53, second gear 54, adjusting member 60, rotating portion 61, rotating shaft 62, first gear 63, pressing portion 65, battery assembly 100, battery 110, battery box 120, receiving room 121, inner wall 121a, receiving recess 122, battery guiding rail, first cover 130, first buckle 131, fastening portion 1311, connecting portion 1312, curved end 1312a, first contacting portion 132, second cover 140, groove 1401, second buckle 141, second contacting point 142, DC charging interface 1422, lamp hole 143, circuit board 150, one end 150a, power light 151, first sealing block 160, second sealing block 170, battery assembly string 180, battery guiding slot 201, lampshade 28, first bulge 281, waterproof plate 35, first portion 35a, second portion 35b, first potting glue groove 351, waterproof member 36, first waterproof cover 37, end 37a, second potting glue groove 371, second waterproof cover 38, second bulge 381, PCB structure 39, AC input 1100, AC-DC conversion circuit 1200, battery DC input 1300, lithium battery balanced protection circuit, lithium battery over-charge and over-discharge protection circuit 1402, DC-DC conversion circuit 1500, LED control circuit 1600, LED lamp panel 1700, AC input interface 3100, AC output interface 3200, AC charging module 4000, PCB 4200, display screen 4300, button 4400, connecting member 4500, AC PCB 4600, supplementary lighting lamp 2000, light source 2100.

DETAILED DESCRIPTION

In order to make the purpose, the technical solution and the advantages of the present disclosure clearer and clearer, a further detailed description of the present disclosure in combination with the attached drawings and embodiments is provided. It can be understood that specific embodiments described herein are only used to explain, but not limited to the present disclosure.

It can be understood that the terms used herein are intended only to describe specific embodiments rather than being intended to limit the present disclosure. As described in the specification and the attached claims, the singular terms "one", "a" and "the" are intended to include the plural forms, unless the context clearly indicates otherwise.

It should also be further understood that the terms "and/or" described in the specification and the attached claims are indicated that any combination and all possible combinations of one or more of the items are listed in relation to each other, and include the combinations thereof.

Figure 2:
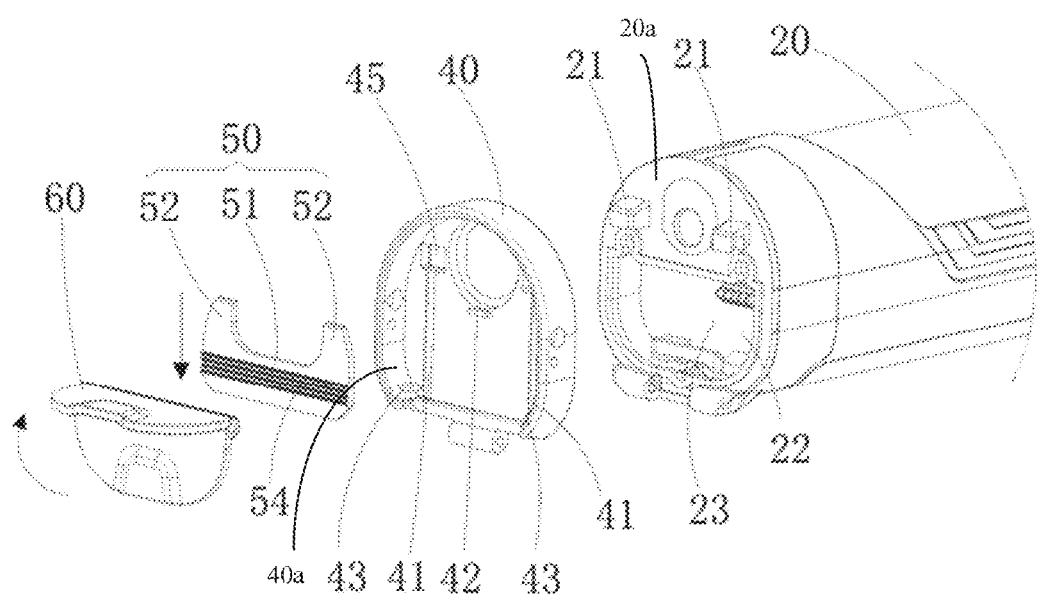
FIG. 2 is an exploded schematic view of the lamp holder of FIG. 1.

Referring to FIG. 1 and FIG. 2, a lamp holder 10 according to an embodiment of the present disclosure includes a housing 20 and a rotation assembly 30 rotating relative to the housing 20. The rotation assembly 30 includes a cover body 40 rotating relative to the housing 20 a resisting member 50 and an adjusting member 60 rotating on the cover body 40 and resisted against the resisting member 50. The housing 20 includes at least one fastener 21 formed on a first end 20a thereof and passing through the cover body 40 to resist against the resisting member 50. By rotating the adjusting member 60, the resisting member 50 is driven to move so that the resisting member 50 is clamped with or separated from the fastener 21.

The rotation assembly 30 is connected to the housing 20 more tightly, by rotating the adjusting member 60, the resisting member 50 is driven to move so that the resisting member 50 is clamped with or separated from the fastener 21, thereby the rotation assembly 30 can be conveniently disassembled from the housing 20. With this design, a battery assembly can be easily disassembled from the housing 20 through a matching relationship between the resisting member 50 and the fastener 21.

Referring to FIG. 2, there are two fasteners 21 in the present disclosure, the resisting member 50 is a U-shaped configuration. The resisting member 50 includes a sliding block 51 connected to the adjusting member 60, a pair of clamping blocks 52 arranged on the sliding block 51 and connected to or separated from the fastener 21, and two opposite guiding rails 53 respectively arranged on the pair of clamping blocks 52.

Figure 3:
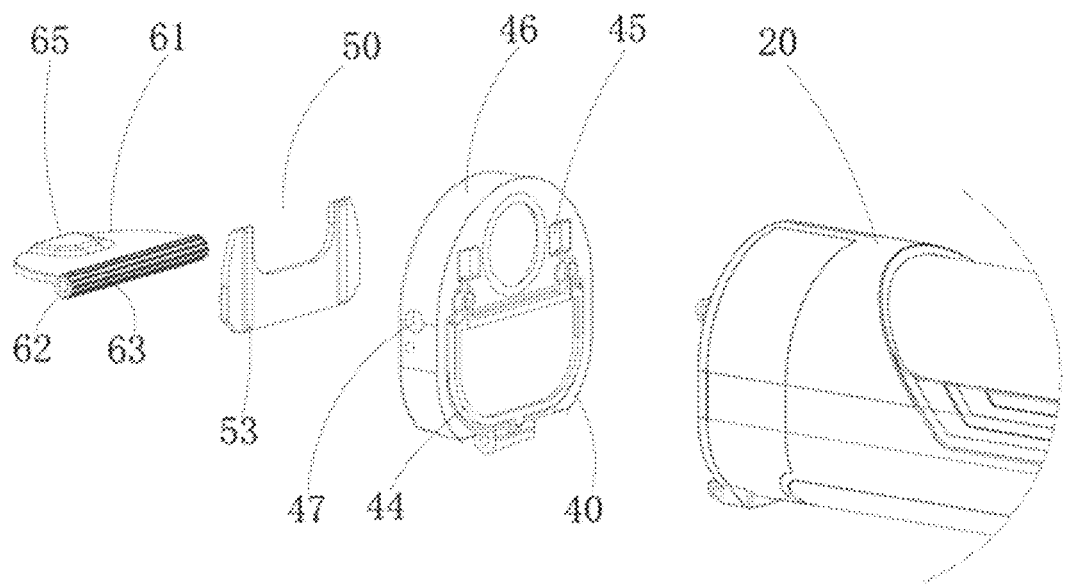
FIG. 3 is an exploded schematic view of the lamp holder of FIG. 1, but shown from another view.

Referring to FIG. 2 and FIG. 3, the cover body 40 includes a pair of guiding recesses 41 for respectively receiving the two opposite guiding rails 53 therein so that the two opposite guiding rails 53 can move in the pair of guiding recesses 41, respectively.

The cover body 40 further includes a limiting block 42 arranged between the two opposite guiding rails 53, when the resisting member 50 is clamped with the fastener 21, the sliding block 51 is resisted against the limiting block 42. The limiting block 42 is provided to further limit the movement of the resisting member 50. The adjusting member 60 includes a rotating portion 61, and a rotating shaft 62 arranged on the rotating portion 61 and rotatably connected to the cover body 40. The rotating shaft 62 includes a first gear 63, and the sliding block 51 includes a second gear 54 meshed with the first gear 63. By meshing the first gear 63 and the second gear 54, when the adjusting member 60 rotates, the first gear 63 and the second gear 54 are relatively driven to drive the sliding block 51 to move, at this time, the resisting member 50 is connected with or separated from the fastener 21.

Figure 4:
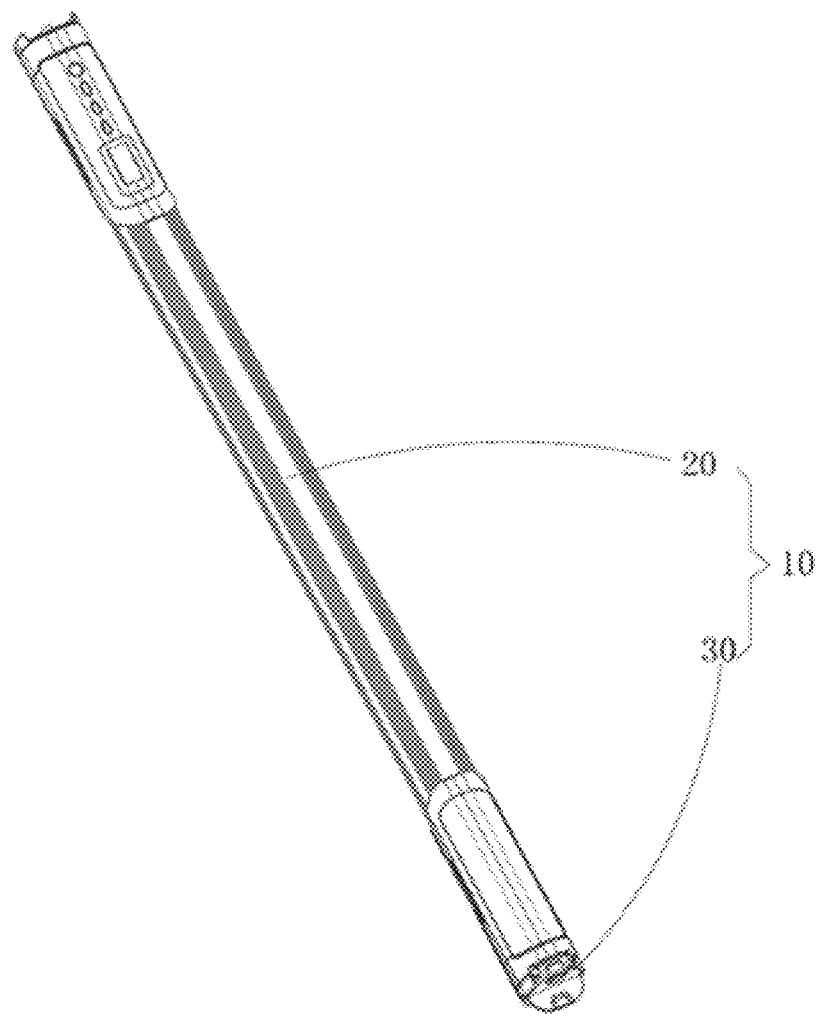
FIG. 4 is a whole schematic view of the lamp holder of FIG. 1.

Referring to FIG. 2, FIG. 3, and FIG. 4, a pressing portion 65 is protruded upwardly from the rotating portion 61 and toggled by a user to rotate the rotating portion 61, which the adjusting member 60 can be rotatably operated by the user.

Referring to FIG. 2, the cover body 40 includes a holding block 43 arranged on a first side 40a thereof towards the rotating portion 61, and when the rotating portion 61 is received in the cover body 40, the rotating portion 61 is placed on the holding block 43.

Referring to FIG. 2 and FIG. 3, the cover body 40 includes a waterproof ring 44 arranged on a second side 40b thereof towards the housing 20. The housing 20 includes a waterproof hole 22, when the cover 40 is covered on the housing 20, the waterproof ring 44 is received in the waterproof hole 22. The cover body 40 is tightly matched with the housing 20, so that the waterproof ring 44 can be locked tightly to the housing 20. The waterproof ring 44 is arranged on the second side 40b of the cover body 40, and a waterproof function can be realized on the premise of conveniently disassembling and assembling the battery assemblies.

In an embodiment of the present disclosure, the cover body 40 includes a through-hole 45. When the cover body 40 is covered on the housing 20, the fastener 21 is passed through the through-hole 45 and exposed out of the through-hole 45. The cover body 40 extends outwardly along a radial direction thereof towards the adjusting member 60 to form an annular casing 46, and a rotating hole 47 is formed on the casing 46 for the rotating shaft 62 passing therethrough to be rotated.

For example, a battery chamber 23 is arranged on a first end 20a of the housing 20 towards the rotation assembly 30 and close to the cover body 40 that rotates with the housing 20, for receiving a plurality of battery assemblies (not shown in figures) therein. The battery chamber 23 is arranged below the fastener 21, when the resisting member 50 is separated from the fastener 21, the adjusting member 60 is rotated relative to the housing 20.

When using the lamp holder 10, the pressing portion 65 is toggled by the user so that the adjusting member 60 is rotated relative to the housing 20, and the first gear 63 and the second gear 54 are driven relative to each other, the resisting member 50 is separated from the housing 20 and the fastener 21 is separated from the cover body 40, at this time, the cover body 40 can be separated from the housing 20, and then the battery assembly can be disassembled from the battery chamber 23 of the housing 20. When the cover body 40 covers on the housing 20, the waterproof ring 44 can be covered on the waterproof hole 22, so as to achieve the waterproof sealing effect and good waterproof performance.

Figure 5:
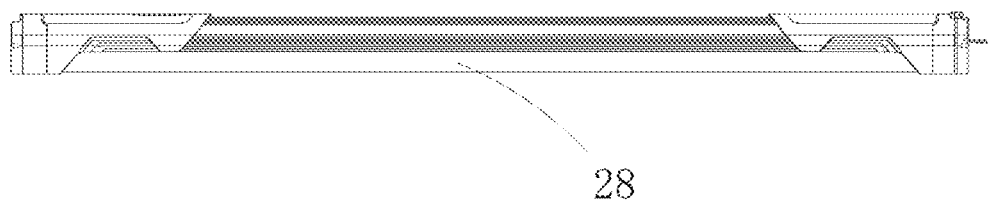
FIG. 5 is a side view of the lamp holder of FIG. 1.

Referring to FIG. 5, as an embodiment of the present disclosure, the housing 20 includes a lampshade 28, with a curved configuration, exposed out of the housing 20 and configured to emit a variety of different light source types.

Figure 6:
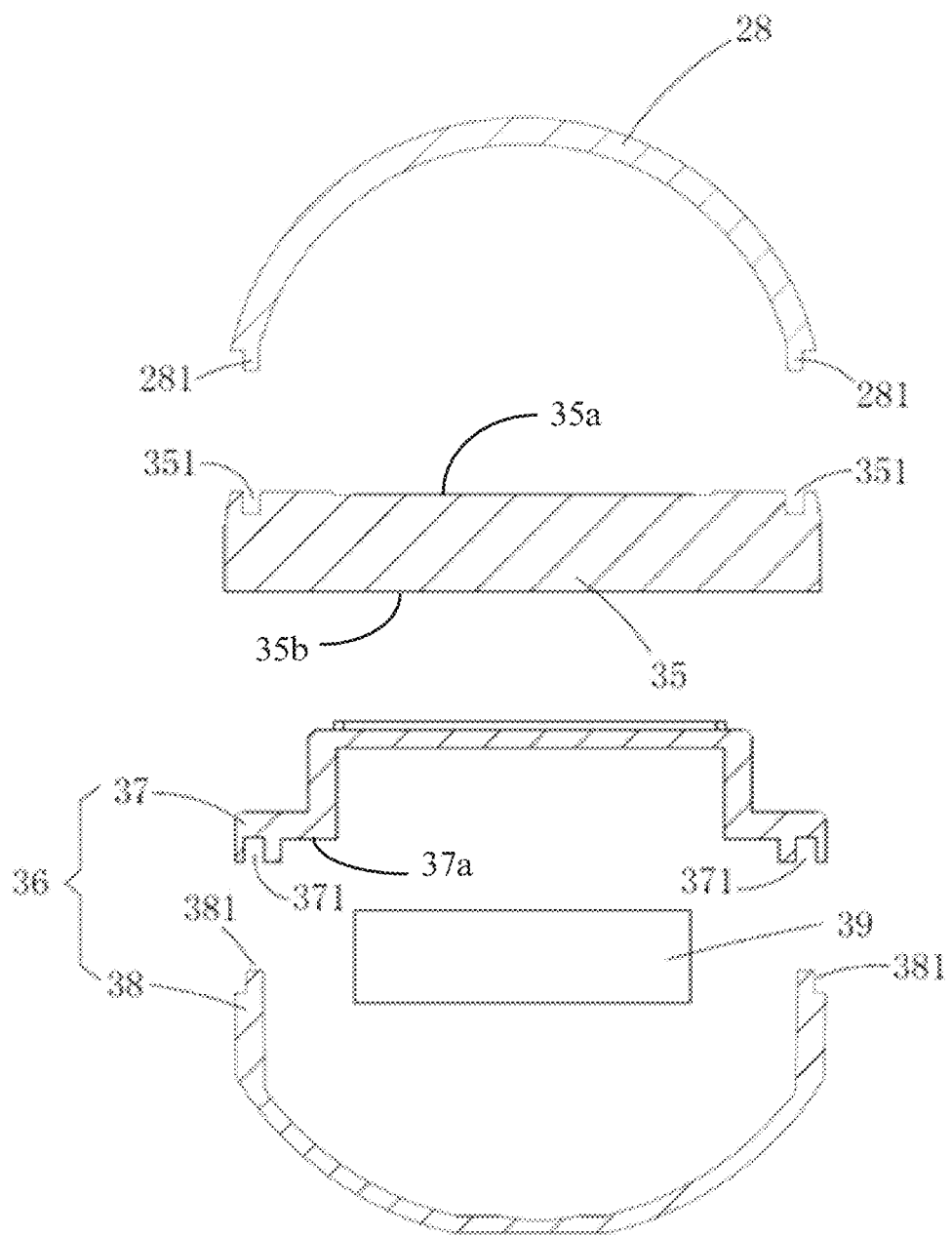
FIG. 6 is a cross sectional view of a lampshade of the lamp holder of FIG. 1.

Referring to FIG. 6, the lampshade 28 includes a waterproof plate 35 made of aluminum alloy. The waterproof plate 35 includes a first potting glue groove 351 arranged on a first portion 35a thereof towards the lampshade 28, and a first bulge 281 arranged on the lampshade 28 towards the waterproof plate 35 and corresponding to the first potting glue groove 351, so that the first bugle 281 is fixed on the waterproof plate 35 by injecting glue into the first potting glue groove 351. The waterproof plate 35 made of aluminum alloy can facilitate auxiliary heat dissipation of the lampshade 28 to enhance heat dissipation effects, and good waterproof effect can be obtained by fixing the first bulge 281 and the first potting glue groove 351 by glue.

The waterproof plate 35 further includes a waterproof member 36 arranged on a second portion 35b thereof away from the lampshade 28. The waterproof member 36 includes a first waterproof cover 37 and a second waterproof cover 38 connected with each other by a dispensing glue way, and a PCB structure 39 is received between the first waterproof cover 37 and the second waterproof cover 38.

The first waterproof cover 37 includes a second potting glue groove 371 arranged on an end 37a thereof towards the second waterproof cover 38, the second waterproof cover 38 including a second bulge 381 arranged towards the first waterproof cover 37 and corresponding to the second potting glue groove 371, the first waterproof cover 37 fixed on the second waterproof cover 38 by injecting glue into the second potting glue groove 371, so as to achieve good waterproof effect by protecting the internal PCB structure 39.

Figure 7:
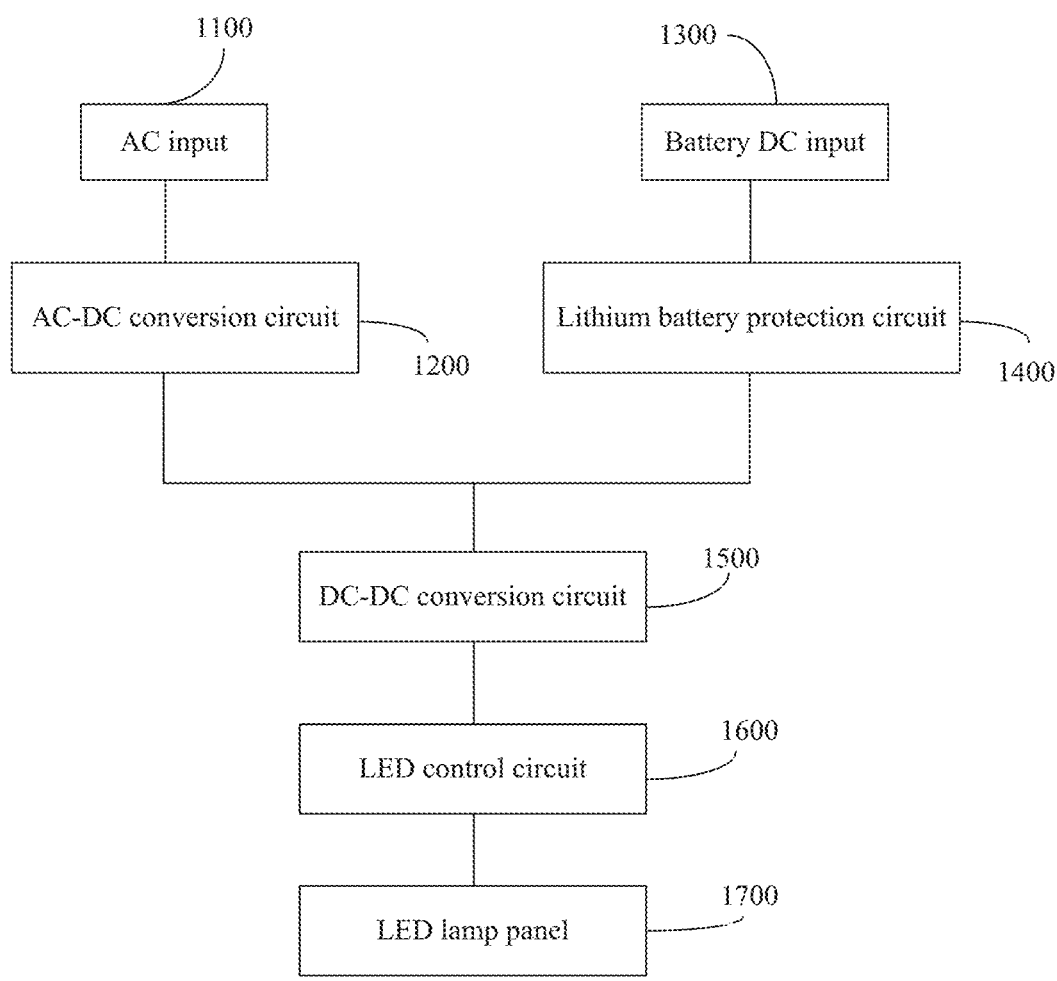
FIG. 7 is a schematic view of modules of the lamp holder of FIG. 1 in accordance with a first embodiment of the present disclosure.
Figure 8:
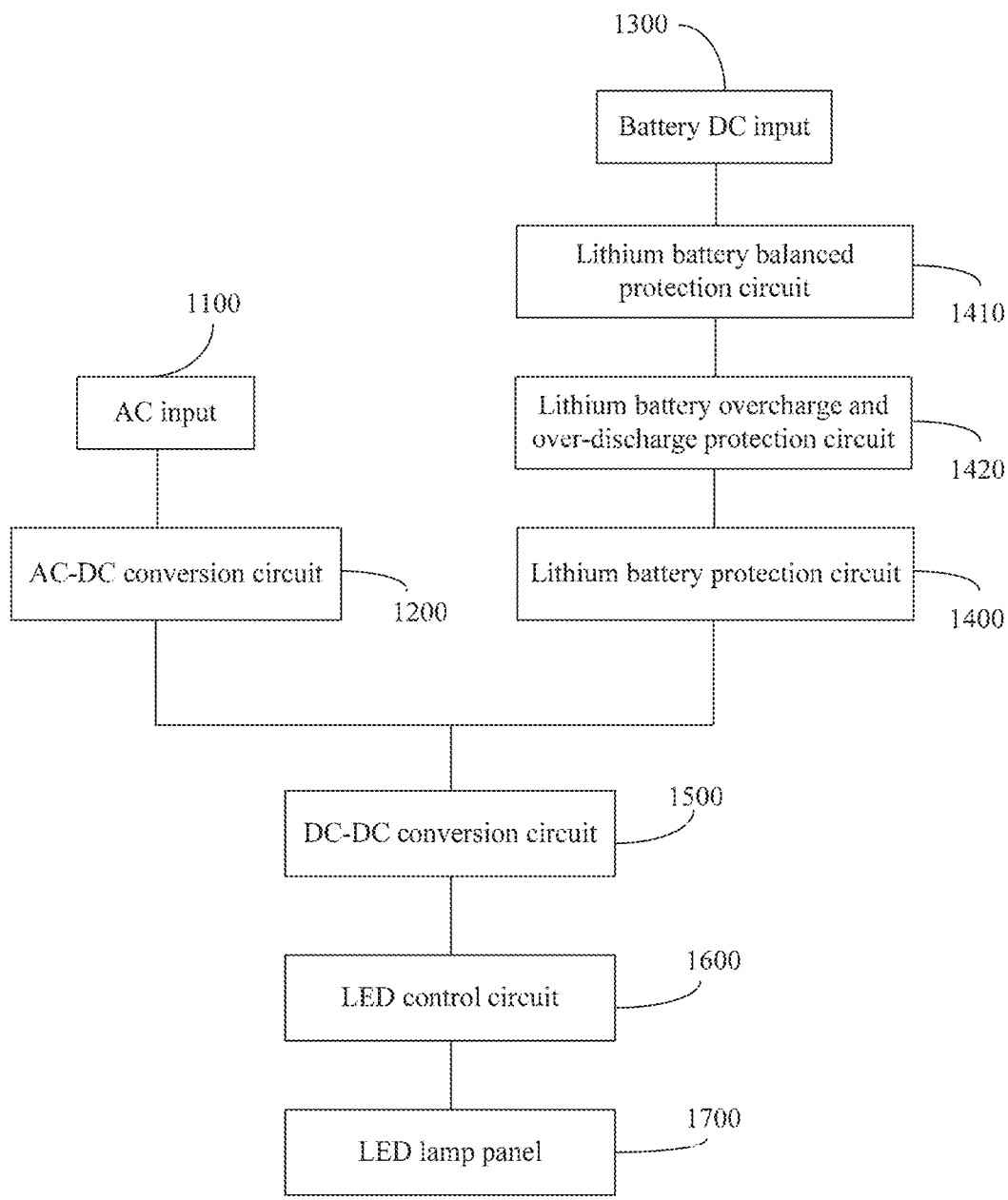
FIG. 8 is a schematic view of modules of the lamp holder of FIG. 1 in accordance with a second embodiment of the present disclosure.

Referring to FIG. 7 and FIG. 8, the lamp holder 10 further includes:

an alternating current (AC) input 1100 configured to connect with an alternating current mains supply;
an AC-DC conversion circuit 1200 electrically connected to the AC input;
a battery DC input 1300 electrically connected to a lithium battery received in the lamp holder;
a lithium battery protection circuit 1400 electrically connected to the battery DC input;
a DC-DC conversion circuit 1500 connected to both the AC-DC conversion circuit 1200 and the lithium battery protection circuit 1400, when the AC input 1100 and the battery DC input 1300 are input at the same time, the AC input 1100 is preferred to be selected; an LED control circuit 1600 electrically connected to the DC-DC conversion circuit 1500; and an LED lamp panel 1700 electrically connected to the LED control circuit 1600.

By the DC-DC conversion circuit 1500, the AC input 1100 and the battery DC input 1300 are configured to separately supply power for the LED lamp panel 1700, when the AC input 1100 and the battery DC input 1300 are input at the same time, the AC input 1100 is preferred to be selected. When the battery DC input 1300 is out of power, the AC input 1100 can supply power to the LED lamp panel 1700, while, when the AC input 1100 is out of power, the battery DC input 1300 can supply power to the LED lamp panel 1700, such dual power supply mode can use an AC power supply or a separate battery to power the LED lamp panel 1700. When using the lamp holder 10, the user can directly connect to the AC input 1100 to supply power for the lamp holder 10, when the AC input environment is not available, the battery can be directly used to supply power for the lamp holder 10. When the AC input 1100 and the battery DC input 1300 are used to supply power at the same time, the AC input power supply mode is preferred to be selected so that the lamp holder 10 can be charged via various ways.

The lithium battery protection circuit 1400 includes a lithium battery balanced protection circuit 1410 and a lithium battery over-charge and over-discharge protection circuit 1402 electrically connected to each other. The lithium battery balanced protection circuit 1410 is electrically connected to the battery DC input 1300, and the lithium battery over-charge and over-discharge protection circuit 1402 is electrically connected to the DC-DC conversion circuit 1500.

Figure 9:
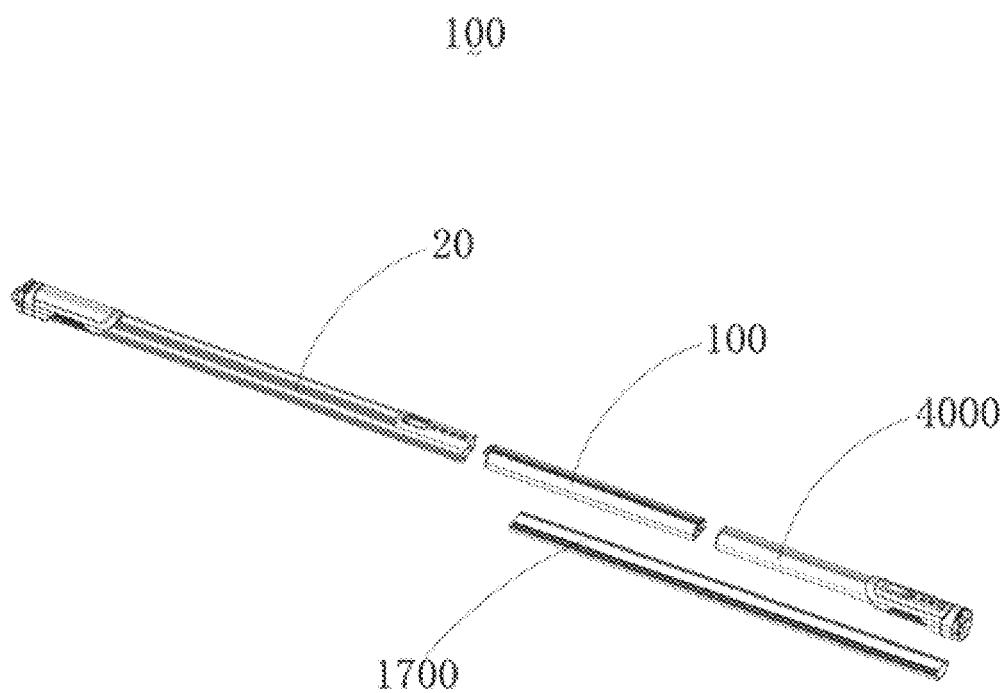
FIG. 9 is a whole exploded schematic view of the lamp holder of FIG. 1.
Figure 10:
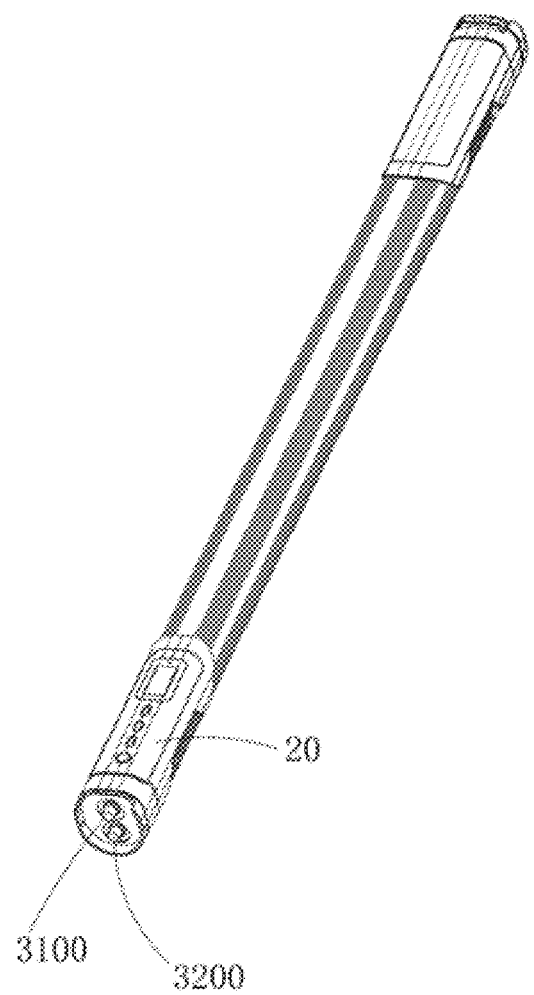
FIG. 10 is an assembly schematic view of the lamp holder of FIG. 1.

Referring to FIG. 9 and FIG. 10, the lamp holder 10 includes a plurality of spliced battery assemblies 100, the housing 20 and an AC charging module 4000 electrically connected to the plurality of spliced battery assemblies 100. Both the plurality of spliced battery assemblies 100 and the AC charging module 4000 are received in the housing 20, and the housing 20 includes an AC input interface 3100 arranged close to the AC charging module 4000 and connected with the AC input 1100.

The housing 20 further includes an AC output interface 3200 arranged close to the AC charging module 4000 and connected in series with an AC input interface 3100 of another lamp holder 10. With such design, the AC input interface 3100 of the lamp holder 10 can be connected with the AC mains supply, the AC output interface 3200 can be connected in series with an AC input interface 3100 of a next adjacent lamp holder 10, and an AC output interface 3200 of the next adjacent lamp holder 10 is connected in series with an AC input interface 3100 of another next lamp holder 10. In this way, a plurality of lamp holders 10 can be connected in series.

Figure 11:
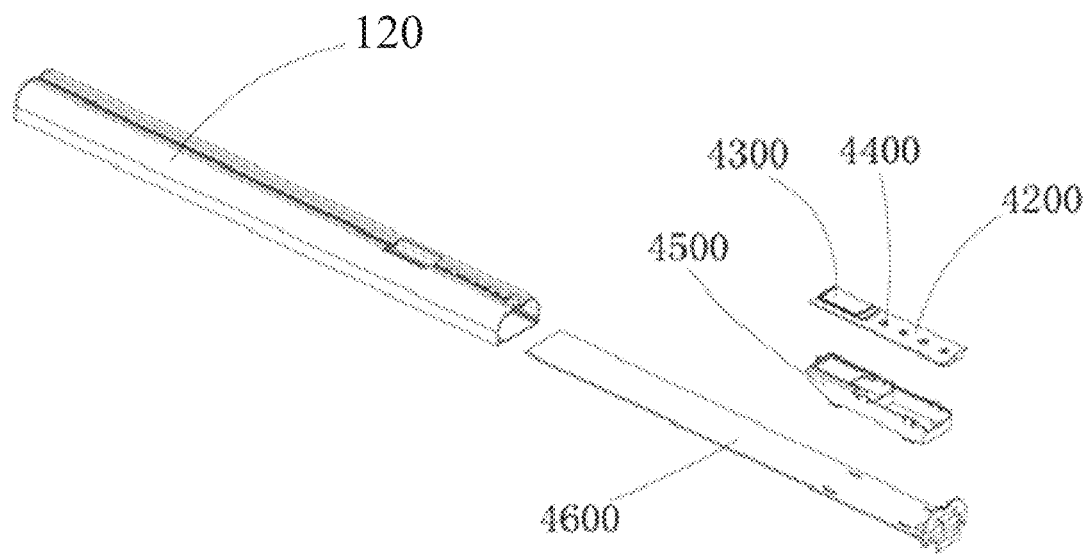
FIG. 11 is an exploded schematic view of an AC charging module of the lamp holder of FIG. 1.
Figure 12:
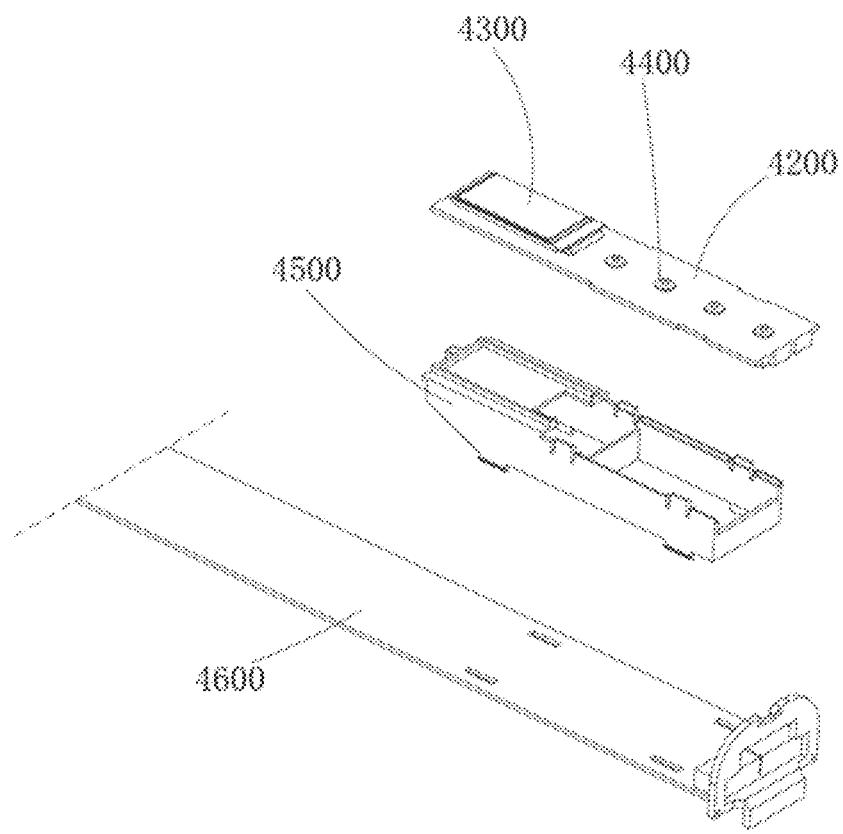
FIG. 12 is similar to FIG. 21, but without showing the battery box thereof.

Referring to FIG. 11 and FIG. 12, the AC charging module 4000 includes a battery box 120 connected between the battery assembly 100 and the housing 20, and a PCB 4200 received in the battery box 120 and arranged close to the AC input interface 3100. The PCB 4200 includes a display screen 4300 and a plurality of buttons 4400 respectively exposed out of the battery box 120, and an AC PCB 4600 and a connecting member 4500 clamped with both the PCB 4200 and the AC PCB 4600.

Figure 13:
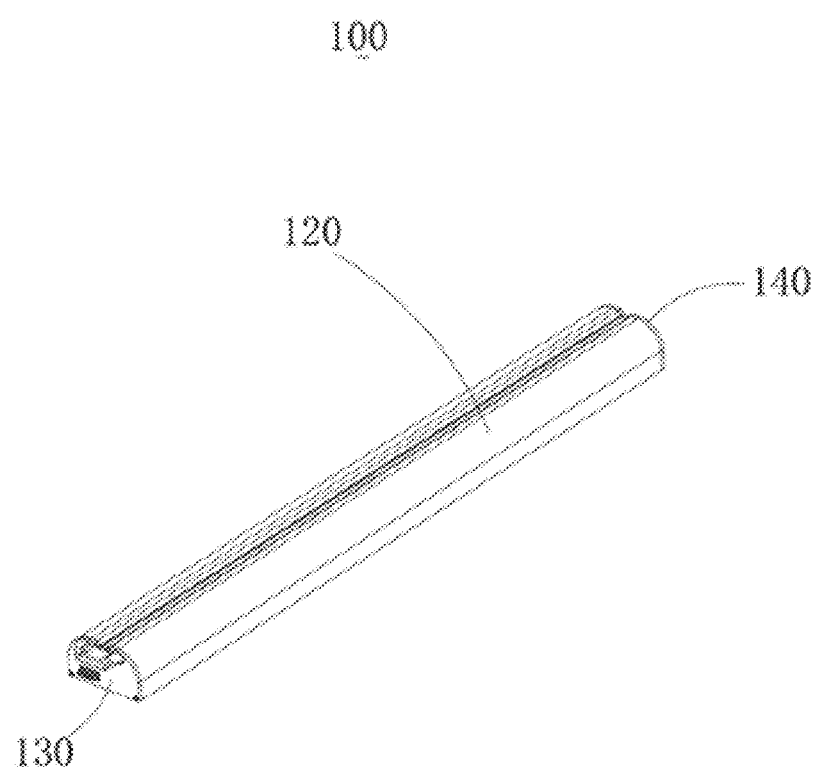
FIG. 13 is a schematic view of a battery assembly in accordance with an embodiment of the present disclosure.
Figure 14:
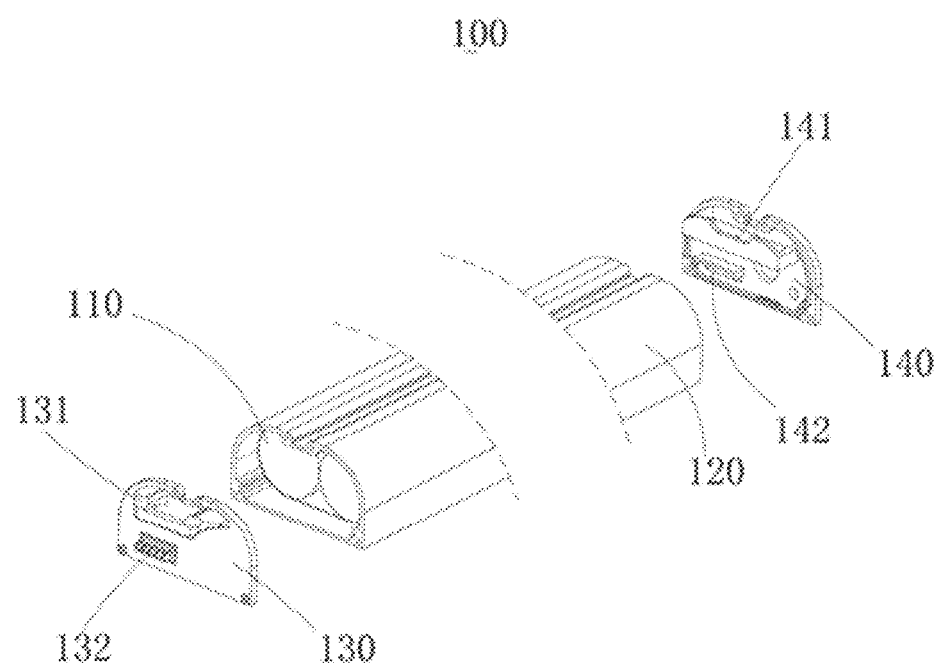
FIG. 14 is an exploded schematic view of the battery assembly of FIG. 13.

Referring to FIG. 13 and FIG. 14, a battery assembly 100 according to a second embodiment of the present disclosure is installed in a battery chamber 23 of a lamp holder 10. The battery assembly 100 includes at least one battery 110, a battery box 120 for receiving the at least one battery 110 therein, and a first cover 130 and a second cover 140 respectively arranged on two sides of the battery box 120. The first cover 130 includes a first buckle 131 and a first contacting point 132, and the second cover 140 includes a second buckle 141 and a second contacting point 142 respectively corresponding to the first buckle 131 and the first contacting point 132.

With such design, the first buckle 131 is correspondingly connected to the second buckle 141, and the first contacting point 132 is correspondingly connected to the second contacting point 142, so that any two battery assemblies 100 are easy to realize mechanical splicing and electrical connection therebetween, and electrical transmission between a plurality of spliced battery assemblies 100 can be facilitated. The plurality of sliced battery assemblies 100 is to avoid an uneven force from occurring at a middle end of a single long battery assembly, which is conducive to protecting the battery assembly 100. The number of the battery assemblies can also be selected according to requirements, which is convenient and practical.

The number of the at least one battery 110 is two, and the at least one battery 110 is a lithium battery and electrically connected to both the first contacting point 132 and the second contacting point 142.

Figure 15:
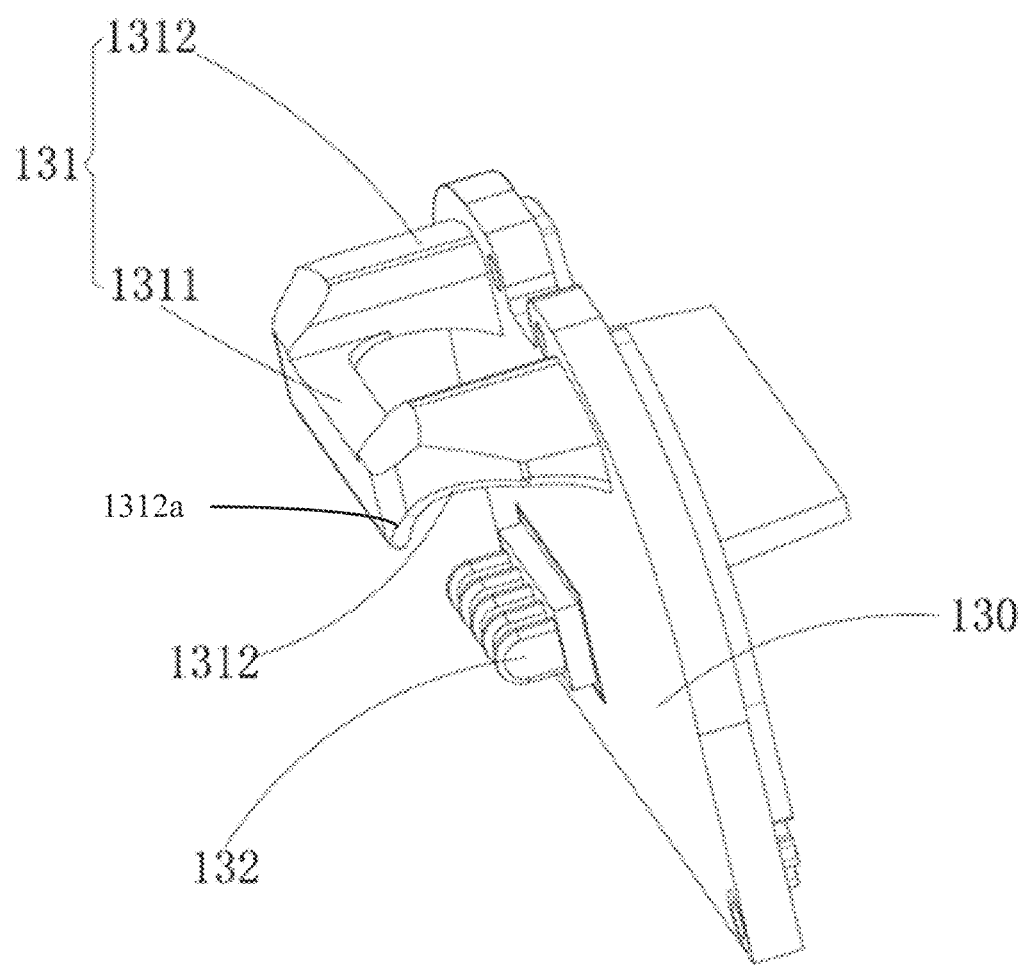
FIG. 15 is a schematic view of a first cover of the battery assembly of FIG. 13.

Referring to FIG. 14 and FIG. 15, the first buckle 131 includes a fastening portion 1311 and a connecting portion 1312 connected with each other. The connecting portion 1312 is fixedly connected with the first cover 130 and having a curved configuration so that the fastening portion 1311 is connected with a curved end 1312a of the connecting portion 1312.

Figure 16:
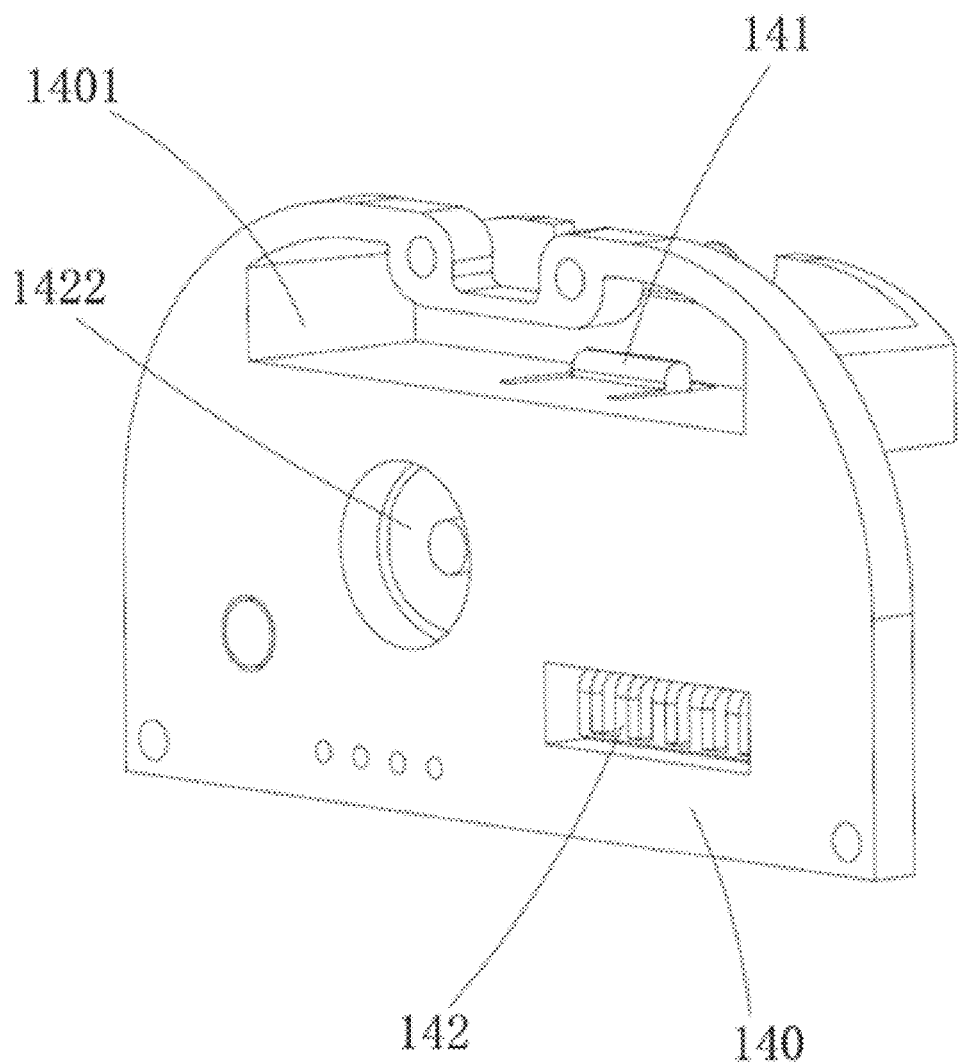
FIG. 16 is a schematic view of a second cover of the battery assembly of FIG. 13.

Referring to FIG. 14 and FIG. 16, the second cover 140 includes a groove 1401 with a shape and position corresponding to the first buckle 131, and the second buckle 141 is received in the groove 1401 and protruding towards away from the at least one battery 110.

Figure 17:
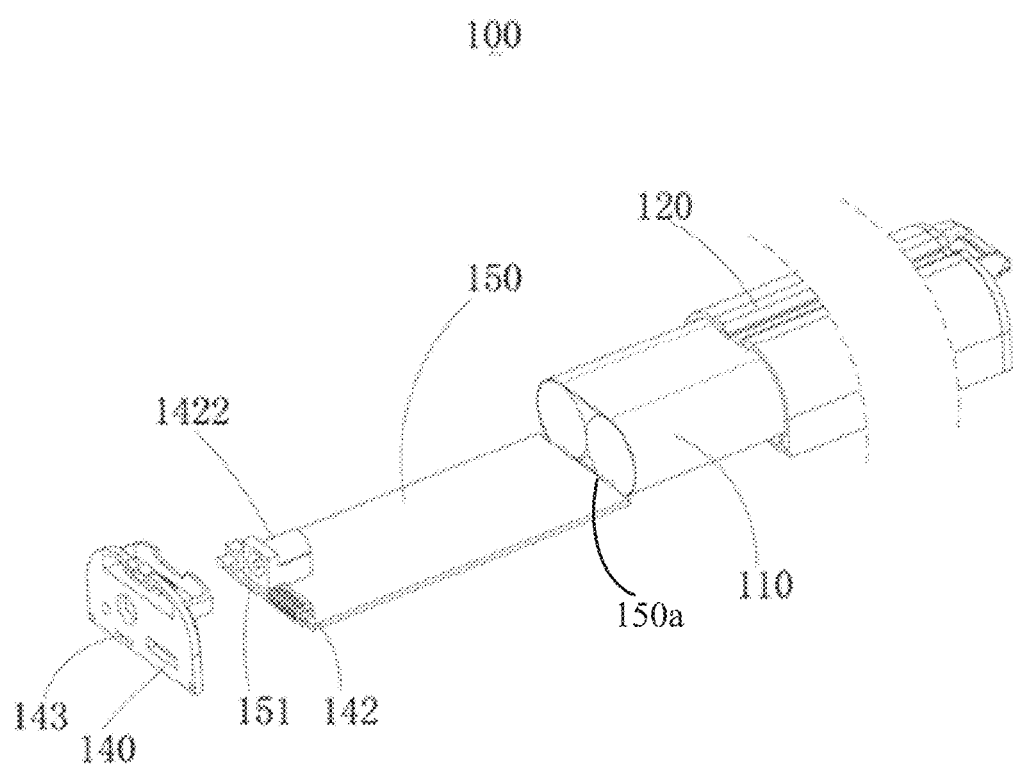
FIG. 17 is similar to FIG. 16, but shown from another view that a circuit board and a battery aren't received in the battery assembly.

Referring to FIG. 17, the battery assembly 100 further includes a circuit board 150 received in the battery box 120. One end 150a of the circuit board 150 is electrically connected to the at least one battery 100, the second contacting point 142 is arranged on the circuit board 150 and electrically connected to the circuit board 150.

The second cover 140 includes a DC charging interface 1422 faced towards the at least one battery 110, electrically connected to the circuit board 150 and exposed out of the second cover 140. The DC charging interface 1422 is provided for charging the at least one battery 110 received in the battery assembly 100.

Figure 18:
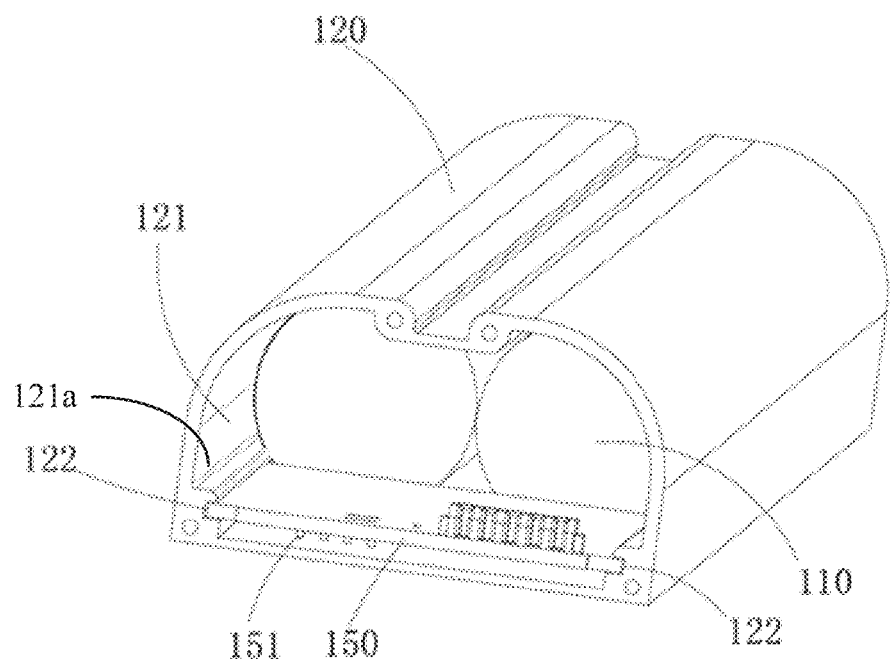
FIG. 18 is a partial assembly schematic view of the battery assembly of FIG. 13.

Referring to FIG. 18, the battery box 120 includes a receiving hole 121 for receiving the at least one battery 110 therein. The receiving hole 121 is a through-hole and an inner wall 121a of the receiving hole 121 is concave to form a receiving recess 122 so that the circuit board 150 is placed on the receiving recess 122.

Referring to FIG. 17 and FIG. 18, a power light 151 is arranged on the circuit board 150 and electrically connected to the circuit board 150. The second cover 140 includes a lamp hole 143 corresponding to the power light 151. With this design, it is convenient and intuitive to display the battery power of the at least one battery 110 in the bate assembly 100 so as to choose according to electricity demands.

Figure 19:
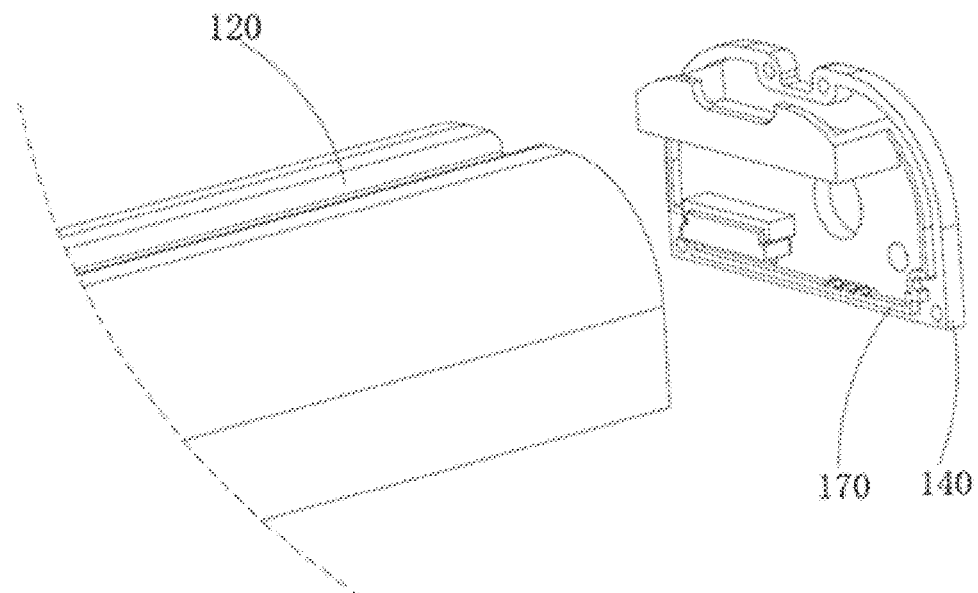
FIG. 19 is a partial schematic view of the battery assembly of FIG. 13, especially shown the second cover and a battery box thereof.
Figure 20:
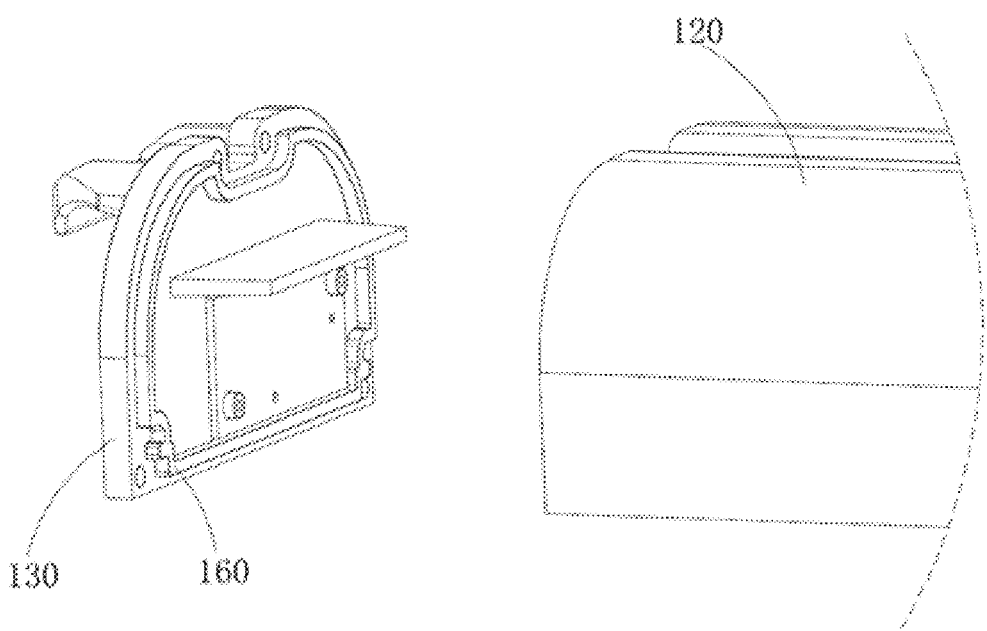
FIG. 20 is similar to FIG. 19, but mainly shown the first cover and the battery box thereof.

Referring to FIG. 19 and FIG. 20, the first cover 130 and the second cover 140 respectively includes a first sealing block 160 and a second sealing block 170 respectively corresponding to the receiving hole 121. When both the first cover 130 and the second cover 140 are connected with the battery box 120, the first sealing block 160 and the second sealing block 170 and the receiving hole 121 are tightly sealed. Both the first sealing block 160 and the second sealing block 170 are provided to tightly seal the first and second covers 130, 140 with the battery box 120, which can avoid water stains flowing into the battery assembly 100 to affect the usage of the at least one battery 110 and the circuit board 150, and have good waterproof performance.

Figure 21:
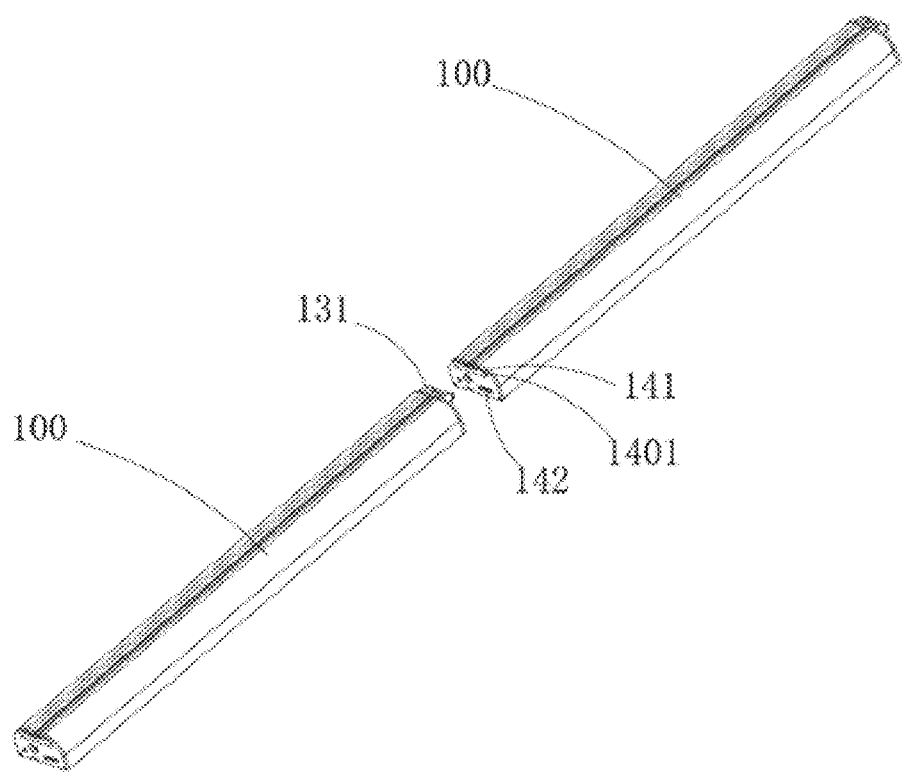
FIG. 21 is a schematic view of a battery assembly string; in accordance with an embodiment of the present disclosure.

Referring to FIG. 21, a battery assembly string 180 according to an embodiment of the present disclosure includes a plurality of battery assemblies 100 spliced together. When the first buckle 131 is connected with the second buckle 141, the first buckle 131 is received in the groove 1401, the fastening portion 1311 is elastically resisted against the second buckle 141 and the first contacting point 132 is electrically connected to the second contacting point 142.

Figure 22:
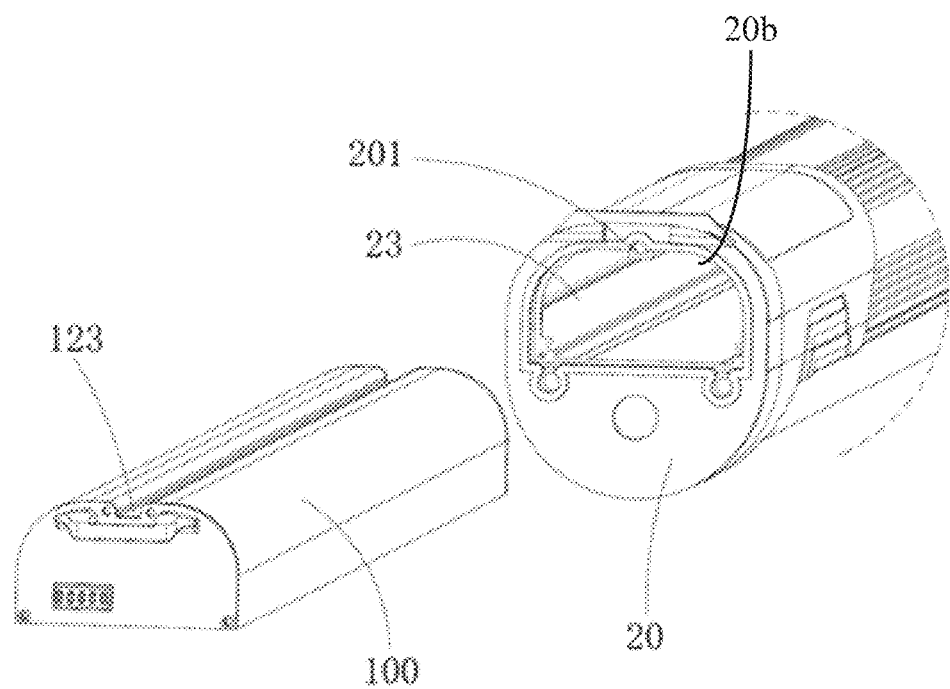
FIG. 22 is a schematic view of the lamp holder of the battery assembly string of FIG. 21.

Referring to FIG. 22, the battery assembly string 180 or the battery assembly 100 is received in the housing 20. The battery chamber 23 is arranged on the housing 20 so that the battery assembly string 180 or the battery assembly 100 is received in the battery chamber 23. The housing 20 includes a battery guiding slot 201 formed on an inner wall 20b thereof, and a surface of the battery box 120 is concave to form a battery guiding rail 123 engaged with the battery guiding slot 201. The battery guiding rail 123 and the battery guiding slot 201 are provided to play as a guiding role for conveniently receiving the battery assembly string 180 or the battery assembly 100 into the battery chamber 23.

Figure 23:
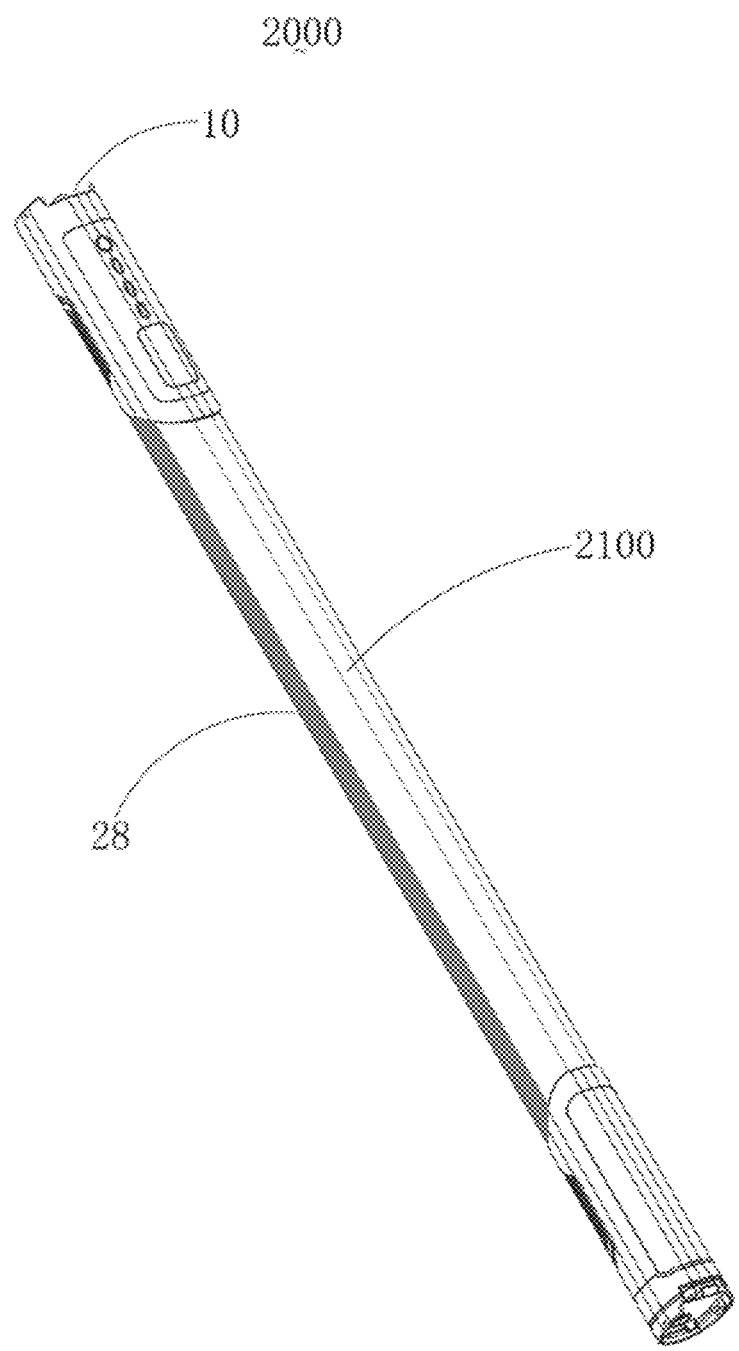
FIG. 23 is a schematic view of a supplementary lighting lamp in accordance with an embodiment of the present disclosure.

Referring to FIG. 23, a supplementary lighting lamp 2000 according to an embodiment of the present disclosure includes the lamp holder 10 mentioned above and a battery assembly (not shown in figures). The housing 20 includes a light source 2100 arranged far away from the lampshade 28 and emitting light of different colors. An effect of the supplementary lighting lamp 2000 is consistent with that of the lamp holder 10 and the battery assembly, which will not be repeated here.

The above embodiments are used only to describe, but not limited to, the technical solution of the present disclosure. Although the features and elements of the present disclosure are described as embodiments in particular combinations, an ordinary skilled person in the art should understand that: each feature or element can be used alone or in other various combinations within the principles of the present disclosure to the full extent indicated by the broad general meaning of the terms in which the appended claims are expressed. Any variations or replacements made by one of ordinary skill in the art without departing from the spirit of the present disclosure shall fall within the protection scope of the present disclosure.

What is claimed is:

1. A lamp holder, comprising a housing connected to a lampshade, and a rotation assembly rotating relative to the housing, wherein the rotation assembly includes a cover body, a resisting member and an adjusting member moving relative to the cover body, the housing includes a fastener formed on a first end thereof, the adjusting member moves on the cover body so that the resisting member is resisted against the fastener, and the rotation assembly is clamped with the housing or separated from the housing; the resisting member comprises a sliding block connected to the adjusting member, a pair of clamping blocks arranged on the sliding block and connected to or separated from the fastener, and two opposite guiding rails respectively arranged on the pair of clamping blocks.

2. The lamp holder as claimed in claim 1, wherein the cover body comprises a pair of guiding recesses for respectively receiving the two opposite guiding rails therein so that the two opposite guiding rails move in the pair of guiding recesses, respectively, the cover body further comprising a limiting block arranged between the two opposite guiding rails, when the resisting member is clamped with the fastener, the sliding block is resisted against the limiting block.

3. The lamp holder as claimed in claim 2, wherein the adjusting member comprises a rotating portion, and a rotating shaft arranged on the rotating portion and rotatably connected to the cover body, the rotating shaft comprising a first gear and the sliding block comprising a second gear meshed with the first gear, a pressing portion protruding upwardly from the rotating portion and toggled by a user to rotate the rotating portion, the cover body comprising a holding block arranged on a first side thereof towards the rotating portion, and when the rotating portion is received in the cover body, the rotating portion is placed on the holding block.

4. The lamp holder as claimed in claim 1, wherein a battery chamber is arranged on a first end of the housing towards the rotation assembly and close to the cover body rotating with the housing, for receiving a plurality of mutually spliced battery assemblies therein.

5. The lamp holder as claimed in claim 1, wherein the lamp holder further comprises:
 an alternating current (AC) input configured to connected with an alternating current mains supply;
 an AC-DC conversion circuit electrically connected to the AC input;
 a battery DC input electrically connected to a lithium battery received in the lamp holder;
 a lithium battery protection circuit electrically connected to the battery DC input;
 a DC-DC conversion circuit connected to both the AC-DC conversion circuit and the lithium battery protection circuit, when the AC input and the battery DC input are input at the same time, the AC input is preferred to be selected;
 an LED control circuit electrically connected to the DC-DC conversion circuit; and
 an LED lamp panel electrically connected to the LED control circuit.

6. The lamp holder as claimed in claim 1, wherein a batter assembly is disposed in a battery chamber of the lamp holder; the battery assembly comprises at least one battery, a battery box for receiving the at least one battery therein, and a first cover and a second cover respectively arranged on two sides of the battery box; a power light is arranged on a circuit board and electrically connected to the circuit board, the second cover comprises a lamp hole corresponding to the power light.

7. A lamp holder comprising a housing connected to a lampshade, and a rotation assembly rotating relative to the housing, wherein the rotation assembly includes a cover body, a resisting member and an adjusting member moving relative to the cover body, the housing includes a fastener formed on a first end thereof, the adjusting member moves on the cover body so that the resisting member is resisted against the fastener, and the rotation assembly is clamped with the housing or separated from the housing; the lampshade is arranged on the housing and comprises a waterproof plate made of aluminum alloy, the waterproof plate comprising a first potting glue groove formed on a first portion thereof towards the lampshade, and a first bulge formed on the lampshade towards the waterproof plate and corresponding to the first potting glue groove, so that the first bugle is fixed on the waterproof plate by injecting glue into the first potting glue groove.

8. The lamp holder as claimed in claim 7, wherein the waterproof plate further comprises a waterproof member arranged on a second portion thereof away from the lampshade, the waterproof member comprising a first waterproof cover and a second waterproof cover connected with each other by a dispensing glue way, and a PCB structure received between the first waterproof cover and the second waterproof cover.

9. The lamp holder as claimed in claim 8, wherein the first waterproof cover comprises a second potting glue groove arranged on an end thereof towards the second waterproof cover, the second waterproof cover comprising a second bulge arranged towards the first waterproof cover and corresponding to the second potting glue groove, the first waterproof cover fixed on the second waterproof cover by injecting glue into the second potting glue groove.

* * * * *